United States Patent [19]

Beni et al.

[11] Patent Number: 4,588,348
[45] Date of Patent: May 13, 1986

[54] ROBOTIC SYSTEM UTILIZING A TACTILE SENSOR ARRAY

[75] Inventors: Gerardo Beni, Old Bridge; Susan Hackwood, Freehold; Lawrence A. Hornak, Ocean, all of N.J.

[73] Assignee: AT&T Bell Laboratories, Murray Hill, N.J.

[21] Appl. No.: 498,908

[22] Filed: May 27, 1983

[51] Int. Cl.$^4$ ................................................ B66C 1/42
[52] U.S. Cl. ..................................... 414/730; 324/235; 414/5; 901/9; 901/33; 901/34; 901/46
[58] Field of Search .................. 901/33, 34, 35, 15, 901/45, 46, 9, 10; 414/729, 730, 735, 5, 6; 338/32 R, 32 H, 69, 99, 114; 324/252, 207, 235, 249; 340/365 L, 825.79, 365 C; 294/902

[56] References Cited

U.S. PATENT DOCUMENTS

| | | | |
|---|---|---|---|
| 2,684,657 | 7/1954 | Dick | 294/902 X |
| 3,449,008 | 6/1969 | Colechia | 414/5 X |
| 3,553,498 | 1/1971 | Yamada | 324/252 X |
| 3,848,252 | 11/1974 | Chang et al. | 340/365 L |
| 4,097,802 | 6/1978 | Mahopac et al. | 340/365 L X |
| 4,366,463 | 12/1982 | Barker | 340/365 L X |
| 4,374,374 | 2/1983 | Goof | 338/114 |
| 4,385,273 | 5/1983 | Lienhard | 324/249 |
| 4,426,884 | 1/1984 | Polchaninoff | 338/114 X |

FOREIGN PATENT DOCUMENTS 844267 7/1981 U.S.S.R. ...................... 901/33 X

OTHER PUBLICATIONS

L. D. Harmon, "Automated Tactile Sensing", The International Journal of Robotics Research, vol. 1, No. 2, Summer 1982, pp. 3-32.

W. D. Hillis, "A High-Resolution Imaging Touch Sensor", The International Journal of Robotics Research, vol. 1, No. 2, Summer 1982, pp. 33-44.

A. H. Eschenfelder, *Magnetic Bubble Technology*, Springer-Verlag, 1980.

R. P. Paul, *Robot Manipulators: Mathematics, Programming, and Control*, Chapter 9, "Compliance", pp. 231-244, The MIT Press, 1981.

Single Key Element Data Input, Niederreiter, IBM Technical Disclosure Bulletin, vol. 19, No. 7, 12/1976.

*Primary Examiner*—Donald W. Underwood
*Attorney, Agent, or Firm*—Michael J. Urbano

[57] ABSTRACT

A movable part of a robot, such as the fingers of the robot hand, are provided with an array of tactile elements mounted on a substrate. Each element includes a magnetic dipole embedded in a compliant medium on one side of the substrate and a magnetic sensor on the other side of the substrate. The dipole and sensor are in parallel planes. A force or torque deforms the compliant medium and displaces the magnetic dipoles with respect to the sensor. The sensor detects the change in magnetic field and produces an electrical signal which is used to control the robot. Magnetoresistive sensors are preferred. To detect torque, each element illustratively includes four sensors arranged at 90° to one another and a magnetic dipole oriented at 45° to each sensor. Also described is the handling of objects by a robot having such a tactile array in its gripper or hand, and the use of a robot to bring an object into contact with such a tactile array mounted, for example, on a table top, thereby enabling pattern recognition functions.

5 Claims, 11 Drawing Figures

ROBOTIC SYSTEM UTILIZING A TACTILE SENSOR ARRAY

BACKGROUND OF THE INVENTION

This invention relates to tactile sensor arrays and, more particularly, to robotic systems which incorporate such arrays in a moving robot part and to manufacturing methods utilizing such robots.

It is becoming evident that tactile sensing would greatly improve the manipulative capacity of robots. See, for example, an article by L. D. Harmon, *International Journal of Robotics*, Vol. 1, p. 3 (1982) and a book by R. P. Paul, *Robot Manipulators*, Chapter 9, MIT Press (1981). In contrast to single-point contact sensing, robotic tactile sensing usually means sensing patterns of touching; i.e., continuous sensing of forces in an array.

Many types of tactile array sensors have been proposed. See, for example, an article by D. Hillis, *International Journal of Robotics*, Vol. 1, p. 33 (1982) and the copending application of J. F. Jarvis et al, application Ser. No. 434,876 filed on Oct. 18, 1982, i.e. U.S. Pat. No. 4,539,554, and assigned to the assignee hereof. Anisotropically resistive materials, semiconductor piezoresistors, piezoelectric transducers, capacitive and photoelectric sensors all show promise for special applications. Disadvantages exhibited by one or another of these devices include hysteresis, fragility, low dynamic range, susceptibility to external influences, etc. A common limitation of all these devices is the lack of torque sensing and, in most cases, also tangential force sensing.

Although torque and tangential force sensing are very useful properties for robotic applications, the known tactile sensors do not provide torque sensing primarily because of the nature of the transduction effect. In fact, the transduction is generally at the atomic level, where the transduction effect (e.g., piezoresistive, magnetostrictive, piezoelectric, etc.) couples one form of energy to another. However, apart from certain effects seen in single crystals (which are not sufficiently robust for robotics) a microscopic coupling between two physical quantities has generally small anisotropic coefficients. Thus, it is very unlikely that any physical effect would have several large components of the transduction tensor, which limits the applicability of microscopic effects to the detection of one or possibly two components of the applied force.

An additional inherent limitation of microscopic transduction effects is the trade-off between sensitivity and fragility. For robotic applications, fragility is a serious consideration. For example, strain gauges, which are highly sensitive transducers, are difficult to implement on robot fingertips. Thus, it is perhaps not surprising that the only known commercial tactile sensor for robotics is based on macroscopic transduction. In this device, (which is labeled the Touch Sensor ™ by its manufacturer, the Lord Corporation of Cary, N.C.) the sensing element is composed of three parts: a light emitting diode (LED), a photodetector and a flexible surface. When the surface is depressed by a force being sensed, the optical path between the LED and the photodetector is interrupted so that the current decrease in the photodetector is a measure of the force exerted on the surface.

SUMMARY OF THE INVENTION

Our invention, in one aspect, is also based on macroscopic transduction but is able to sense and measure torque and tangential forces as well as normal forces. In accordance with one embodiment of our invention, a tactile sensor includes an array of tactile elements mounted on a substrate. Each element includes a magnetic dipole embedded in a compliant medium, a substrate supporting the medium, and a magnetic sensor in proximity to the dipole. The dipole and sensor are oriented in parallel planes. When a normal force deforms the compliant medium and displaces the magnetic dipole toward the sensor, the sensor detects the change in magnetic field and produces an electrical signal.

Depending on the shape of the object contacting the array, one or more tactile elements may be actuated. The signals from the actuated elements may be used in a variety of ways; for example, to measure the force applied by the object or to identify the shape of the object (as in pattern recognition). In any event, the sensor array may be positioned on a table top, and the object may be handled by a robot to bring it into contact with the sensor array. Alternatively, the sensor array may be mounted on a movable part of a robot, such as its fingers or hand. Thus, when the part contacts an object it also contacts the tactile sensor. The signals from the actuated tactile elements would then be used to control the robot, i.e., the position of its movable part, so that the robot can handle objects in a manufacturing process. In accordance with another embodiment of our invention, to detect tangential forces or torque, each tactile element includes illustratively four sensors arranged at 90° to one another and a magnetic dipole oriented at 45° to each sensor.

BRIEF DESCRIPTION OF THE DRAWING

Our invention, together with its various features and advantages, can be readily understood from the following, more detailed description taken in conjunction with the accompanying drawing, in which.

DETAILED DESCRIPTION

Figure 1:
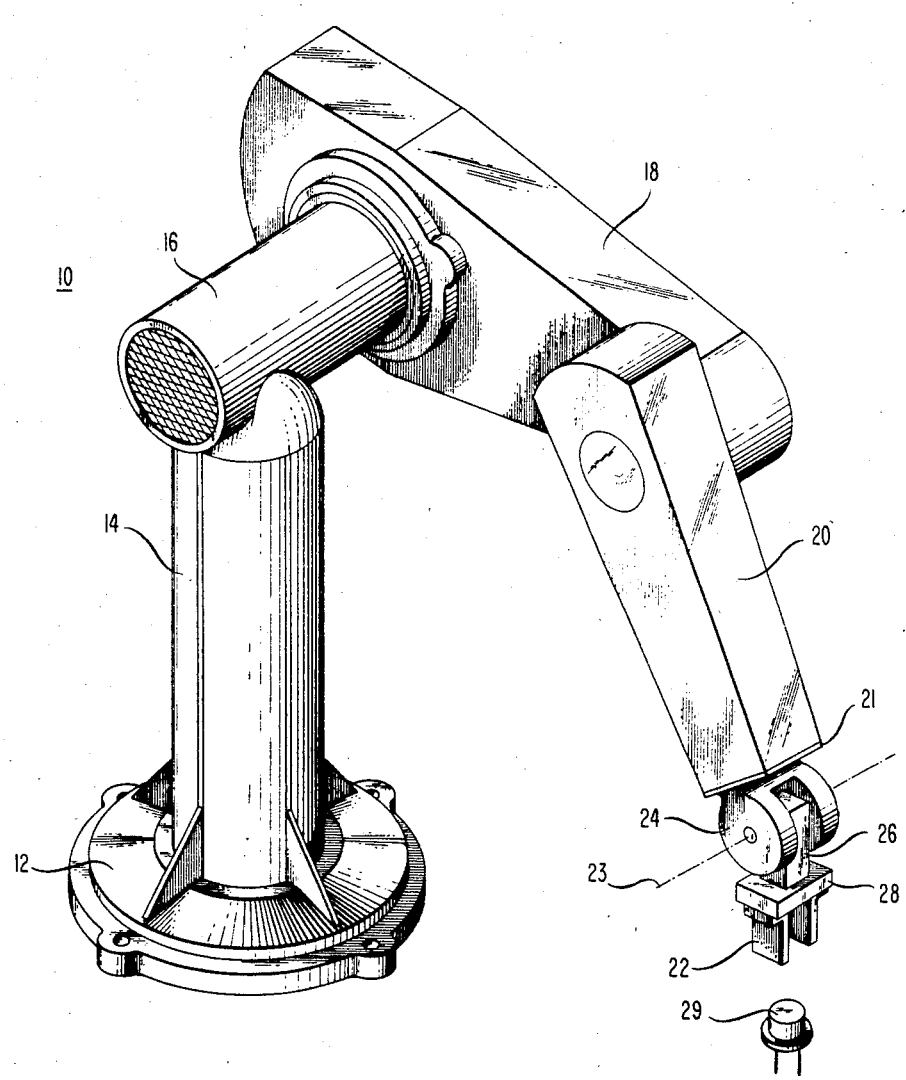
FIG. 1 is an isometric view of a robot for handling an object illustratively depicted as a header package for a semiconductor component.
Figure 2:
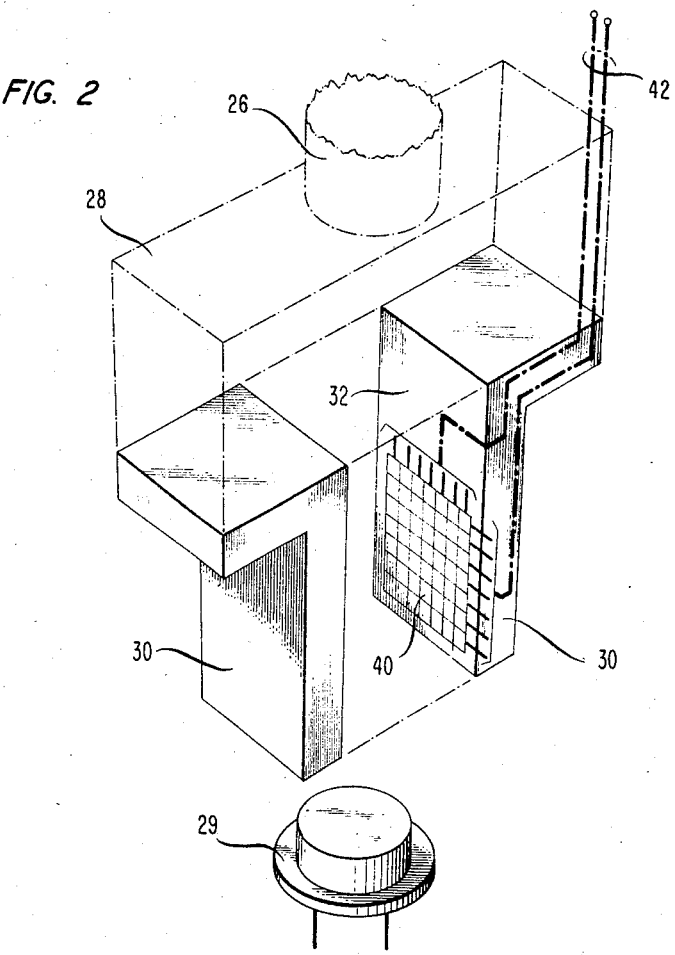
FIG. 2 is an enlarged isometric view of the robot gripper of FIG. 1 which has been provided with a tactile sensor array on each finger in accordance with one embodiment of our invention.

With reference now to FIGS. 1 and 2, there is shown a robot 10 comprising a base 12, a vertical cylindrical body 14 mounted on the base, a shoulder member 16 cantilevered at the top of the body 14, an upper arm 18 pivotally mounted at one end to the shoulder member 16 and at the other end to forearm 20. The extremity of forearm 20 includes a pneumatic or servo-driven hand commonly termed a gripper 22 which is pivotally mounted thereto to enable rotation about three axes. The gripper 22 includes a base 21 which rotates about the axis of forearm 20, a post 26 which pivots about axis 23 of flanges 24, and a palm member 28 which rotates about the axis of post 26. A pair of fingers 30 are slidably mounted on the palm member 28. However, as is well known in the art, the fingers 30 may be pivotally mounted as described in our copending application Ser. No. 480,826, filed on Mar. 31, 1983, i.e. U.S. Pat. No. 4,541,771.

In accordance with one embodiment of our invention, at least one, and preferably both, of the facing surfaces 32 of the fingers 30 is provided with a tactile array 40 of sensors which will be described in more detail in conjunction with FIGS. 3–7. The signals generated by array 40 in response to forces applied thereto in handling object 29 are coupled via cables 42 to a suitable processor (e.g., processor 50 of FIG. 4).

In a manufacturing process, object 29 might be, for example, a package or header for a semiconductor component. Since the object may be delicate, the gripper 22 should be able to pick it up without crushing it (hence normal force should be sensed), without dropping it or allowing it to slip (hence tangential force should be sensed), and without allowing it to rotate (hence torque should be sensed). To achieve these ends, the tactile array is designed as follows.

Figure 3:
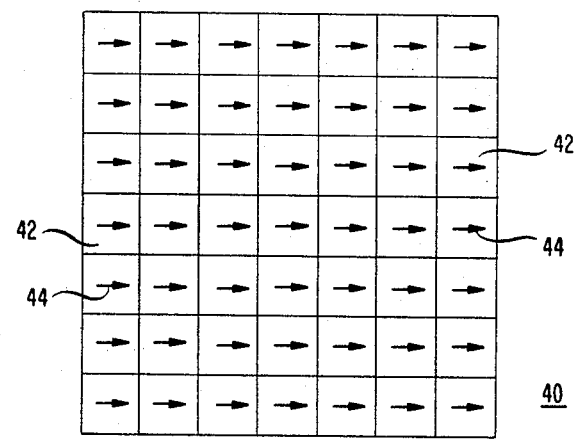
FIG. 3 is a top view of a tactile sensor array in accordance with one embodiment of our invention.
Figure 4:
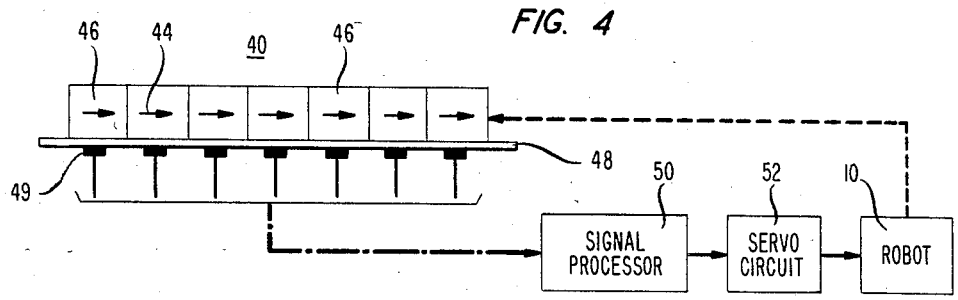
FIG. 4 is a side view of FIG. 3 and shows typical system interconnections between the sensors, a signal processor, a servo circuit, and the robot.

The array 40 shown in FIG. 3 is typically a matrix arrangement of tactile elements 42. For purposes of illustration, a square array having seven elements on a side is depicted. Each element includes a magnetic dipole 44, and all the dipoles are oriented essentially parallel to and coplanar with one another. As can be seen in FIG. 4, each dipole 44 is embedded in a body 46 (e.g., a cube) of a compliant medium. The bodies 46 are arranged adjacent to one another on one side of an electrically insulative substrate 48 to form the array. In addition, each element includes a magnetic sensor 49 on the other side of the substrate. Alternatively, the sensors 49 may be embedded in substrate 48 or may be formed on top of it, provided that electrical contact to them can still be made. The dipoles 44 in the compliant medium and the elongated dimension of the sensors 49 are aligned with one another and are oriented in parallel planes. Each sensor 49 is connected to a signal processor which, in turn, supplies an output, indicative of a force applied to the array, to a servo circuit 52. The latter controls the position of the robot 10; i.e., the position of its hand, gripper or other movable part used to handle object 29.

Illustratively, each element of the 7×7 array shown in FIG. 3 measures 2×2 mm. The combination of this level of resolution and number of elements is adequate for general robotic applications.

Figure 5:
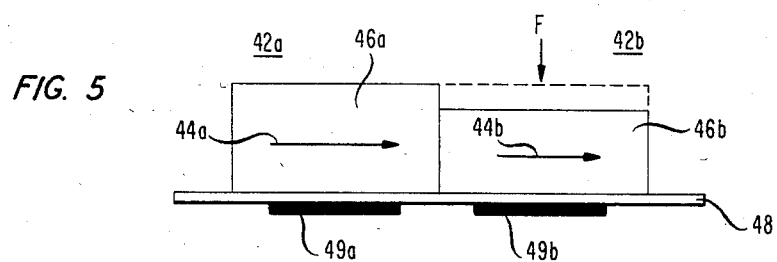
FIG. 5 is an enlarged view of two tactile elements of the array of FIG. 4 showing one element compressed by a normal force F.

The mechanism of operation is illustrated in FIG. 5 which shows two adjacent tactile elements 42a and 42b. Element 42b, on the right, is subject to a normal force F. This force deforms the compliant medium 46b (shown here schematically) and displaces the magnetic dipole 44b toward the sensor 49b. The sensor 49b detects the change in magnetic field and produces an electrical signal, which is fed to signal processor 50 external to the array.

As noted previously, our tactile array need not be mounted on a robot; it could be mounted, for example, on a table top and the object could be carried by a robot to the array. In this way, signal processor 50 can be used to quantify the force applied by the object or to identify the shape of the object, and to supply the results to a utilization device (e.g., a display) not shown.

The available semiconductor magnetic sensors which are easily fabricated in arrays are based either on the magnetoresistive or on the Hall effect. Simple Hall effect sensors can detect a dipole translation (as shown in FIG. 5) but not a dipole rotation in the plane parallel to the substrate 48. Thus, Hall sensors cannot be easily arranged to detect a torque applied in this plane. Magnetoresistive elements, on the other hand, can be easily arranged on the substrate to detect both translation and rotation, and hence are preferred.

Figure 6:
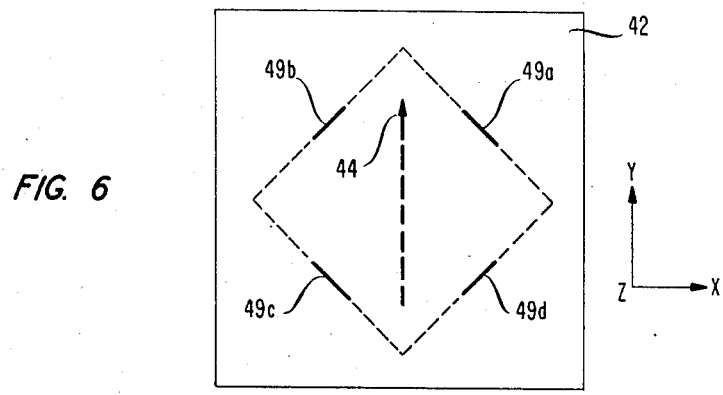
FIG. 6 is a top view of a tactile element containing four magnetoresistive sensors for sensing torque or tangential forces.
Figure 7:
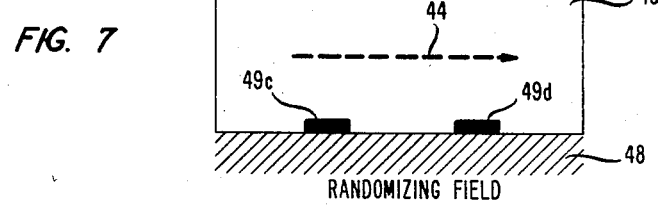
FIG. 7 shows how the element of FIG. 6 is provided with a randomizing magnetic field to reduce hysteresis effects.

FIGS. 6 and 7 show one embodiment of a tactile element 42 in which four magnetoresistive sensors 49a–d are arranged on the substrate so as to detect translation (normal forces), and rotation (torque), as well as tangential forces. The arrow 44 represents the dipole which is embedded in the medium above the substrate. The size of each sensor (exaggerated in the figures) is about 100 μm long by 2 μm wide by 0.05 μm thick. The angle between each adjacent sensor is 90°; i.e., the sensors lie along adjacent edges of a square and the dipole 44 lies along a diagonal of the square. The sensors are made, for example, of permalloy which is a ferromagnetic alloy comprising 19% Fe and 81% Ni. The resistivity of permalloy is 17 μohm/cm. However, because the material is magnetoresistive, the resistance along the major axis of the sensor is a function of the magnetic field parallel to it. Relative changes up to 3.5% are possible, depending on the intensity of the field. Differences between the detected resistances of the four sensors allow reconstruction of the degree of translation and rotation of the dipole.

For example, a clockwise torque about the z-axis causes the head of dipole 44 to rotate toward sensor 49a. The dipole rotation generates in opposite sensors 49a and 49c equal signals which, however, are greater than the signals from opposite sensors 49b and 49d. The size of the signals is related to the magnitude of the torque whereas the pair of sensors having the larger signals identifies the direction of the torgue. On the other hand, a tangential force in the y-direction displaces dipole 44 toward sensors 49a and 49b and away from sensors 49c and 49b. Again, the size of the signals is related to the magnitude of the force whereas the pair of sensors having larger signals identifies the direction of the force. Similarly, tangential forces in the x-direction are detected. Finally, normal forces (translation in the z-direction) are detected as previously described with reference to FIG. 5.

Of course, a force in an arbitrary direction may include torque components as well as vector components in one or more of the x, y, z directions. These components may be simultaneously monitored and/or measured and, for example, compared using a suitable computer system to reference values in order to perform desired robotic functions.

If magnetic hysteresis due to the domain structure of the permalloy material is a concern, it can be reduced by a randomizing magnetic field built into the substrate 48 as shown in FIG. 7. Existing magnetic bubble memory technology, as described by A. H. Eschenfelder, *Magnetic Bubble Technology*, Springer-Verlag (1980), provides all the features of the magnetic sensing part of the tactile elements. Permalloy magnetoresistors of the size indicated above, deposited on an iron garnet substrate which randomizes the domains, can be used for this purpose. Alternatively, a reset magnet located beneath the substrate can be used to reset to zero or a fixed value the magnetic field after each tactile event. However, if the hysteresis effect can be quantified, it can also be compensated for in the software used in a computer or processor which performs the force calculations and controls the robot.

A major advantage of this sensing technique is the small size of the magnetoresistors. On a $2 \times 2$ mm square it is easy to accommodate many sensors. For illustrative purposes, we have described the use of four sensors which makes it possible to detect four degrees of freedom of dipole motion; i.e., displacement in the x, y, and z directions and torque about the z-axis. The maximum number of degrees of freedom for the dipole is five. In our configuration we do not sense the pitch about the perpendicular. Because of the smallness of the sensors, it is possible to make electrical connections to each element via contact pads (not shown) around the perimeter of the chip. Using a standard form of matrix addressing, each element is accessed by 4 columns and 4 rows of parallel wires, which can be distributed as 14 leads per side of the tactile array (one per mm).

Illustratively, the magnetic dipoles 44 are fabricated of vicalloy (a Co, V, Fe alloy) or chromindur (a Cr, Fe, Co alloy) which have high field intensities ($H_c=214$ and 380 Oe, respectively) and are available in thin sheet form (about 25 $\mu$m thick). As is well known in the magnetic bubble art, they can also be patterned and spray-etched in an acid solution. In fact, magnetic cards with arrays of vicalloy dipoles, $1 \times 1$ mm, separated by 1-2 mm are commercially available. On this scale of separation the magnetic fields of the dipoles do not interfere.

Finally, the compliant medium 46 can be tailored to the particular force sensitivity required, typically 1-100 g/mm$^2$ for robotic applications. In this work we have used Sylgard TM (a trademark of Dow Corning Corporation of Midland, Mich.) which is a solventless silicon resin polymer. Sylgard flows easily before curing and bonds to the substrate well. After curing, the polymer has good elastic and thermal properties. As with the other components of our tactile array, the design is not material specific and can therefore be optimized for the desired characteristics.

EXAMPLE

To estimate the influence of embedding many dipoles in a compliant material the following experiment was conducted. A chip was prepared with two parallel adjacent magnetoresistive sensors of dimensions $100 \times 2 \times 0.05$ $\mu$m and a center-to-center distance of 1.6 mm on a substrate or iron garnet. Electrical connections to each sensor were made by aluminum wire stitch bonding at the edge of the chip. A thin layer (about 0.25 mm) of Sylgard was poured over the surface and partially cured. The dipoles were small pieces of 25 $\mu$m thick vicalloy measuring about $0.75 \times 0.5$ mm which had been magnetized along their lengths in a 20 kOe field. The dipoles were positioned over the surface of the sensors and embedded in a further layer of Sylgard about 0.7 mm thick. After outgassing in a vacuum and curing at 150° C., the tactile properties of the sensors were tested using a commerically available desk-top robot. The robot touched the surface of the Sylgard above one sensor with a $1.5 \times 0.5 \times 2$ mm piece of Teflon TM (Teflon is a trademark of Dow Corning Corporation) and depressed the surface so that a displacement of about 100 $\mu$m was observed for the dipole. The Teflon was then raised 1 mm and depressed again. This procedure was repeated about 100 times at a frequency of about 1 sec$^{-1}$ for the two sensors alternately. The resistance of the permalloy changed on depressing the Sylgard by about 1%. The resistance of one element did not change significantly when the other was depressed, and there was no observable hysteresis from the compliant material.

We have tested the tactile elements for sensitivity to normal force and tangential force (torque). For this experiment the dipole was not embedded in the compliant material because an accurate measurement of distance and angle of the dipole with respect to the sensing element was required. A small piece of chromindur alloy measuring about $0.1 \times 0.7 \times 0.9$ mm was magnetized in a 20 kOe magnetic field along its axis and mounted on a rod of Teflon on an x-y micrometer stage. The magnetoresistive sensor was positioned in a plane parallel to the substrate, adjacent and perpendicular to the dipole, and could be rotated in the plane.

Figure 8:
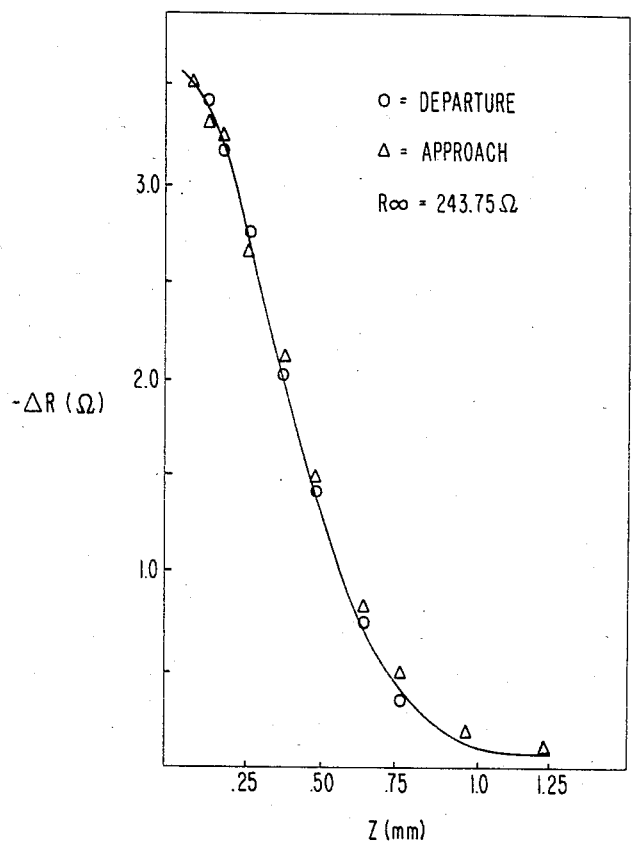
FIG. 8 is a graph of the change of resistance of a magnetoresistive element as a function of distance for a chromindur dipole having dimensions of approximately 0.1×0.7×0.9 mm.
Figure 9:
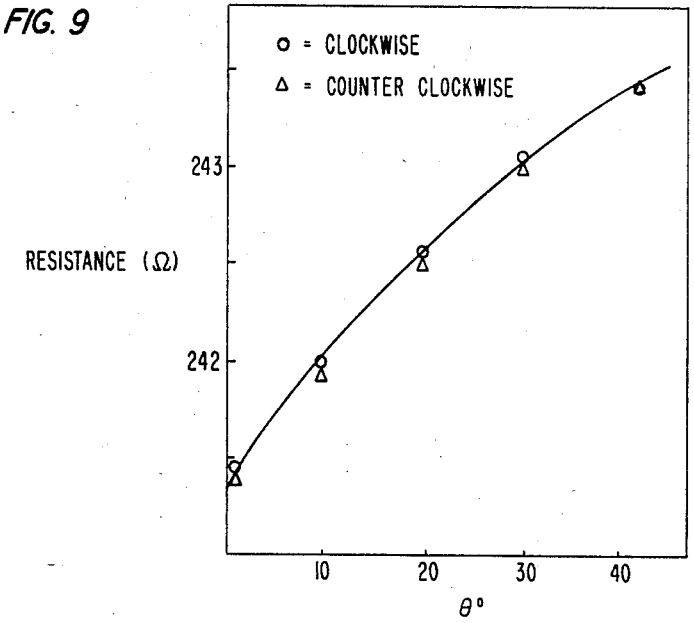
FIG. 9 is a graph of change of resistance of the magnetoresistive element of FIG. 8 as a function of the angle of rotation (about the z axis) of the dipole from the direction perpendicular to the major axis of the sensor.

We observed a decrease in resistance ($\Delta R$) as the dipole was brought closer to the sensor (distance z) as shown in FIG. 8. The magnetoresistive effect was of the order of 1%. Hysteresis was negligible: data were taken while increasing (open circular data points) and decreasing (triangular data points) the distance of the dipole from the magnetoresistor. FIG. 9 shows the magnetoresistance increase for rotation of the dipole through angle $\theta$ about its axis while at a fixed distance z from the sensor. A torque-sensitivity is unlikely to involve rotations of more than 40° on each side of the longitudinal axis. In this region FIG. 9 shows that there was negligible hysteresis and that the angle resolution was about 3°.

Inasmuch as our tactile array incorporates magnetic sensors, care should be exercised to reduce interference with extraneous magnetic fields. However, since the magnetic sensing is done on a scale of less than 500 $\mu$m (corresponding to the linear range of FIG. 8 from about 0.2 0.7 mm), only strong magnetic fields would interfere with the function of the array. One solution would be to position a Hall sensor (not shown) below the array, with a range slightly longer than that of the magnetoresistors, so as to detect the presence of extraneous fields and thereby give an indication of a possibly erroneous force measurement. In addition, it should be noted that the gauge factor of the tactile element is relatively small. Viewed as a piezoresistive device, its sensitivity depends on the compliant material which could introduce hysteresis, if not optimized. The choice of materials, though, is larger than for elasto-optic tactile sensors, since we are not restricted to a material with special optical properties. This consideration applies also to deformations produced by heating of the surface by friction. Other temperature problems are not serious. As is well known in the art, temperature compensation of the magnetoresistors is accomplished simply by bridging with a reference resistor per array.

Figure 10:
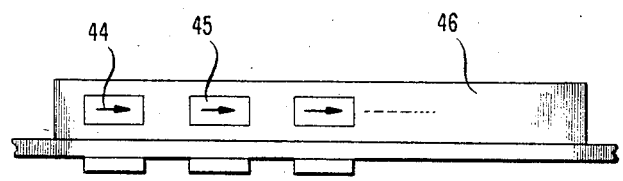
FIGS. 10 and 11 are schematics showing alternative embodiments of the compliant medium/dipole arrangement in accordance with our invention.
Figure 11:
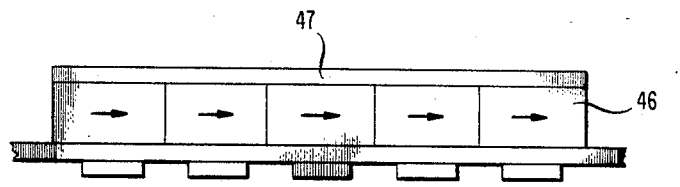

It is to be understood that the above-described arrangements are merely illustrative of the many possible specific embodiments which can be devised to represent application of the principles of the invention. Numerous and varied other arrangements can be devised in accordance with these principles by those skilled in the art without departing from the spirit and scope of the invention. In particular, the compliant layer may be formed as a composite (FIG. 10) where each dipole 44 is embedded in a small block 45 of one type of material, and the array of blocks is embedded in another material 46. In addition, as shown in FIG. 11, the compliant material may be formed as two layers 46 and 47 so that, as the surface layer 47 becomes worn during operation, it can be replaced easily without disturbing the dipoles in underlying layer 46.

One significant characteristic of our invention is that the resolution of the array is determined by the size of its tactile elements, i.e., about 1-2 mm. However, with each tactile element, four degrees of freedom can be sensed continuously. Thus, as in the human skin, the pattern discrimination capacity is much finer than the two-point resolution. The latter is approximately the same in the human skin and in the robot tactile sensors so far proposed. But human tactile perception is much finer than two-point resolution because the human skin has an underlying sensor array which can be shifted and/or rotated minutely and continuously over the surface. It is this finer-scale pattern-discriminating property that robotic tactile sensors like our invention are beginning to emulate.

Finally, it should be noted that our tactile sensor invention may be combined with the magnetic proximity sensor described by G. Beni et al in copending application Ser. No. 480,826, supra, and/or with the optical inspection-type sensor described by G. Beni et al in copending application Ser. No. 498,881 filed on May 27, 1983, both of which are assigned to the assignee hereof.

What is claimed is:

1. A robotic system comprising
  a robot having a movable robot part for handling an object,
  a tactile sensor incorporated in said part so as to generate an electrical signal in response to forces applied thereto by said object, and
  means responsive to said signal for controlling said movable robot part,
  said tactile sensor comprising an array of tactile elements each of which includes a layer of a compliant medium, means forming a magnetic dipole embedded in said medium, and adjacent said dipole a plurality of magnetoresistive sensors oriented at essentially 90° to one another and at essentially 45° to said dipole.

2. The robotic system of claim 1 including at least four magnetoresistive sensors oriented along the four edges of a square, said dipole being oriented along a diagonal of said square.

3. The robotic system of claim 2 including means forming a randomizing magnetic field adjacent said medium.

4. The robotic system of claim 1 wherein said tactile sensor includes a substrate, said compliant medium is formed on one surface of said substrate and said magnetoresistive sensors are formed on the opposite surface of said substrate.

5. The robotic system of claims 1, 2, 3 or 4 wherein said movable part comprises a gripper including a movable finger having a surface which contacts said object, said tactile sensor being formed on said surface.

* * * * *